United States Patent
Schuster

(10) Patent No.: US 9,807,486 B2
(45) Date of Patent: Oct. 31, 2017

(54) LOUDSPEAKER ASSEMBLY IN A VEHICLE USING EXPANDABLE MATERIAL

(71) Applicant: Harman Becker Automotive Systems GmbH, Karlsbad (DE)

(72) Inventor: Michael Schuster, Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 82 days.

(21) Appl. No.: 14/280,570

(22) Filed: May 17, 2014

(65) Prior Publication Data

US 2014/0341391 A1 Nov. 20, 2014

(30) Foreign Application Priority Data

May 17, 2013 (EP) ..................... 13168304

(51) Int. Cl.
| | | |
|---|---|---|
| *H04R 1/02* | (2006.01) | |
| *B60R 11/02* | (2006.01) | |
| *C09J 5/08* | (2006.01) | |
| *C25D 13/12* | (2006.01) | |
| *C25D 13/20* | (2006.01) | |

(52) U.S. Cl.
CPC .......... *H04R 1/028* (2013.01); *B60R 11/0217* (2013.01); *C09J 5/08* (2013.01); *C25D 13/12* (2013.01); *C25D 13/20* (2013.01); *H04R 1/025* (2013.01); *H04R 2499/13* (2013.01)

(58) Field of Classification Search
CPC ......... B60J 5/0452; B60J 5/0454; H04R 1/02; H04R 1/021; H04R 1/023; H04R 1/025; H04R 1/026; H04R 1/028; H04R 2499/13; B60R 11/02; B60R 11/0217; B60R 11/0223; C09J 5/08; C25D 13/12; C25D 13/20
See application file for complete search history.

(56) References Cited

U.S. PATENT DOCUMENTS

| | | | | |
|---|---|---|---|---|
| 4,598,178 A | * | 7/1986 | Rollins | ............... H04R 9/06 381/354 |
| 5,040,803 A | * | 8/1991 | Cieslik | ............... B62D 25/04 156/79 |
| 5,266,133 A | | 11/1993 | Hanley et al. | |

(Continued)

FOREIGN PATENT DOCUMENTS

| | | |
|---|---|---|
| GB | 2106801 A | 4/1983 |
| JP | 2004208067 A * | 7/2004 |
| WO | 2013011699 A1 | 1/2013 |

OTHER PUBLICATIONS

English machine translation of JP 2004-208067 (Yakata et al., Vehicle Speaker Box Structure, published Jul. 2004).*

(Continued)

*Primary Examiner* — Mark Fischer
(74) *Attorney, Agent, or Firm* — Brooks Kushman P.C.

(57) ABSTRACT

A method for mounting a loudspeaker carrier in a vehicle. The method includes providing a loudspeaker carrier and providing an expandable material. The method further includes arranging the expandable material between the loudspeaker carrier and a mounting site on bodywork of the vehicle and activating the expandable material such that the material expands, forming a foam structure, and causes the loudspeaker to be secured to the bodywork.

28 Claims, 3 Drawing Sheets

(56) References Cited

U.S. PATENT DOCUMENTS

| | | | |
|---|---|---|---|
| 2008/0110694 A1* | 5/2008 | Niezur | B62D 29/002 |
| | | | 181/264 |
| 2012/0027222 A1* | 2/2012 | Kirsch | B60R 11/0217 |
| | | | 381/86 |
| 2013/0228392 A1 | 9/2013 | Iwata et al. | |
| 2015/0145287 A1* | 5/2015 | Harwin | B60R 11/0217 |
| | | | 296/193.07 |

OTHER PUBLICATIONS

Extended European Search Report for corresponding Application No. 13168304.7, mailed Oct. 10, 2013, 9 pages.

* cited by examiner

LOUDSPEAKER ASSEMBLY IN A VEHICLE USING EXPANDABLE MATERIAL

CROSS-REFERENCE TO RELATED APPLICATIONS

This application claims priority to EP Application No. 13 168 304.7 filed on May 17, 2013, the disclosure of which is incorporated in its entirety by reference herein.

TECHNICAL FIELD

The disclosure relates to a loudspeaker carrier, a loudspeaker assembly and a method for mounting a loudspeaker carrier in a vehicle.

BACKGROUND

Vehicles such as automobiles may include an infotainment system with one or more loudspeakers. The loudspeakers may be mounted at various sites within the vehicle, for example in the dashboard, in the door panels and/or underneath the seats, depending on the available space and number and type of loudspeakers of the infotainment system.

Commonly a loudspeaker is mounted in a cavity formed within the vehicle bodywork. The cavity may be fabricated by inserting a deformable plastic precursor in an opening in the vehicle bodywork and expanding the plastic precursor to form the cavity. The loudspeaker module may be screwed into the structure so that the diaphragm of the loudspeaker is positioned above the opening to the cavity.

Further arrangements and methods for mounting a loudspeaker in a vehicle which are simple to perform are, however, desirable.

SUMMARY

A loudspeaker carrier is provided that comprises a layer of expandable material arranged on a surface to be mounted to a mounting site of a vehicle bodywork.

A loudspeaker assembly is provided that comprises a loudspeaker carrier, a mounting site on a vehicle bodywork and a layer of expandable material arranged between the loudspeaker carrier and the mounting site.

A loudspeaker assembly is provided that comprises a loudspeaker carrier, a mounting site on a vehicle bodywork, and foamed material arranged between the loudspeaker carrier and the mounting site and securing the loudspeaker carrier to the mounting site.

A method for mounting a loudspeaker carrier in a vehicle. The method includes providing a loudspeaker carrier and providing an expandable material. The method further includes arranging the expandable material between the loudspeaker carrier and a mounting site on bodywork of the vehicle and activating the expandable material such that the material expands, forming a foam structure, and causes the loudspeaker to be secured to the bodywork.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
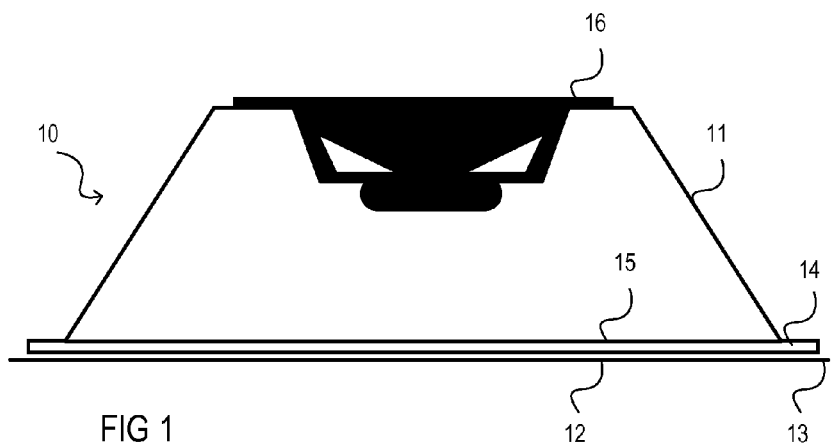
FIG. 1 is a schematic diagram of a first exemplary loudspeaker assembly.

FIG. 1 illustrates a first exemplary loudspeaker assembly 10 including a loudspeaker carrier 11, a mounting site 12 on a portion of a vehicle bodywork 13 and a layer 14 of expandable material which is positioned on a surface 15 of the loudspeaker carrier 11 which is to be mounted on the mounting site 12 of the vehicle bodywork 13.

In this example, the loudspeaker carrier 11 is a loudspeaker enclosure. However, the term loudspeaker carrier is used to denote any structure supporting directly or indirectly a loudspeaker diaphragm 16. In this particular example, the loudspeaker diaphragm 16 faces away from the mounting site 12.

The expandable material 14 has a composition such that it may be activated to cause the material to expand and, in particular, to form a foam structure with an increased volume. Upon activation, the expandable material 14 increases in volume to extend between the mounting surface 15 of the loudspeaker carrier 11 and the mounting site 12. Additionally, upon activation, the expandable material 14 becomes tacky and acts as an adhesive so that the expanded material with the foam structure also provides an adhesive joint between the loudspeaker carrier 11 and the mounting site 12 so as to secure the loudspeaker carrier 11 to the vehicle bodywork 13. The expandable material may be rubber-based or thermoplastic based and may be activated by subjecting it to a temperature above a predetermined threshold value, for example.

Figure 2:
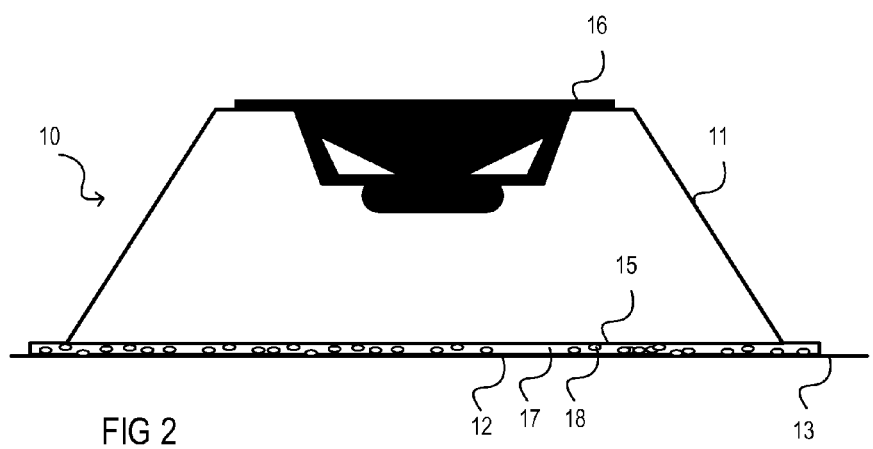
FIG. 2 is a schematic diagram of a loudspeaker carrier secured to vehicle bodywork.

FIG. 2 illustrates the loudspeaker assembly 10 of the first exemplary embodiment after activation of the expandable material. The foam structure 17 is indicated schematically in FIG. 2 by the closed pores 18. However, the closed pores 18 are merely of an illustrative nature and are not intended to limit the structure of the expanded material to a foam structure with closed pores. The expanded material may also include a structure in which the foam includes interconnected cavities which extend from one side of the material to another.

An exemplary expandable material 14 may include an ionomer, a temperature activated foaming agent capable of increasing the volume of the material when it is subjected to an elevated temperature, and a tackifier for imparting tackiness to at least the outer surface of the expandable material when it is subjected to the elevated temperature. The ionomer may be an ethylene-$\alpha,\beta$ ethylenically unsaturated carboxylic acid, partially metallic ion neutralized copolymer ionomer. The relative proportions of the ionomer, temperature activated foaming agent and tackifier may be adjusted to provide the desired increase in volume, activation temperature and adhesion. Specific examples of compositions suitable for use as the expandable material are given in the examples disclosed in U.S. Pat. No. 5,266,133.

The volume increase of the expandable material 14 maybe 100% to 1200%. The volume increase may be selected by selecting the proportion of the temperature activated foaming agent included in the expandable material 14. The expandable material 14 may be activated by subjecting the expandable material to an elevated temperature, for example 100° C. to 250° C.

In an exemplary method, the activation of the expandable material and the adhesion of the loudspeaker carrier 11 to the vehicle bodywork 13 is carried out during the so-called bake process or electrocoat bake process used in the priming and electrocoat process carried out on the vehicle bodywork. In the electrocoat process, the entire vehicle chassis is subjected to a bake process, for example at 180° C., to dry and cross-link the anticorrosion coatings, primer and paintwork applied to the chassis or vehicle bodywork. The loudspeaker carrier 11 is arranged on the mounting site 12 in the manufacturing line before the electrocoat bake process and subjected to the electrocoat bake process along with the vehicle bodywork. This exemplary method avoids the need for a further process to secure the loudspeaker carrier 11 to the vehicle bodywork 13.

The expanded material having the foam structure 17 may also be used to seal the loudspeaker carrier 11 to the vehicle bodywork 13 and may also act as an acoustic baffle to improve the perceived sound quality of the loudspeaker. Since mechanical fixings such as screws and clips are no longer required to secure the loudspeaker carrier 11 to the vehicle bodywork 13, any unwanted sources of noise such as rattles, which may occur at these mechanical fixings, can be avoided.

In examples in which the expandable material is not itself adhesive at the activation temperature, a further adhesive layer may be used to attach the expandable material 14 to the loudspeaker carrier 11 and the mounting site 12 of the vehicle bodywork 13.

In the first exemplary loudspeaker assembly 10 illustrated in FIGS. 1 and 2, the mounting site 12 is planar and continuous. In the following exemplary loudspeaker assemblies, the expandable material 14 is used to mount a loudspeaker carrier 11 on non-planar surfaces. Like features are indicated with like reference numbers.

Figure 3:
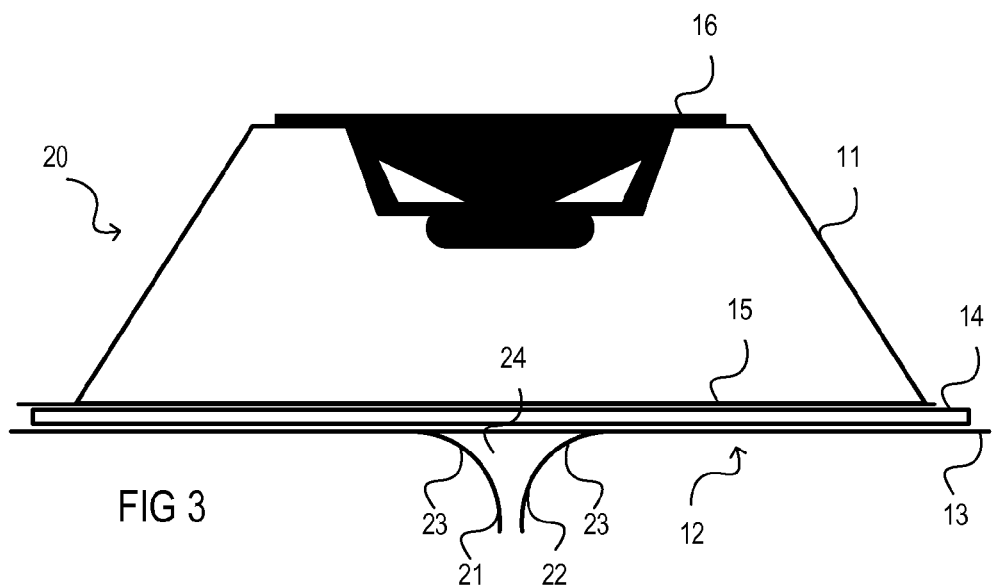
FIG. 3 is a schematic diagram of a second exemplary loudspeaker assembly.

FIG. 3 illustrates a second exemplary loudspeaker assembly 20 which includes a loudspeaker carrier 11 which is to be mounted by a layer of expandable material 14 to vehicle bodywork 13. In the second exemplary loudspeaker assembly 20, the mounting site 12 of the vehicle bodywork includes two abutting portions 21, 22, each with a chamfered edge 23 which produces a cavity 24 in the vehicle bodywork 13 at the mounting site 12 between the two abutting portions 21, 22. Upon thermal activation of the expandable material 14, the cavity 24 is filled, at least in part, by the increased volume of the expanded material which now has a foam structure.

Figure 4:
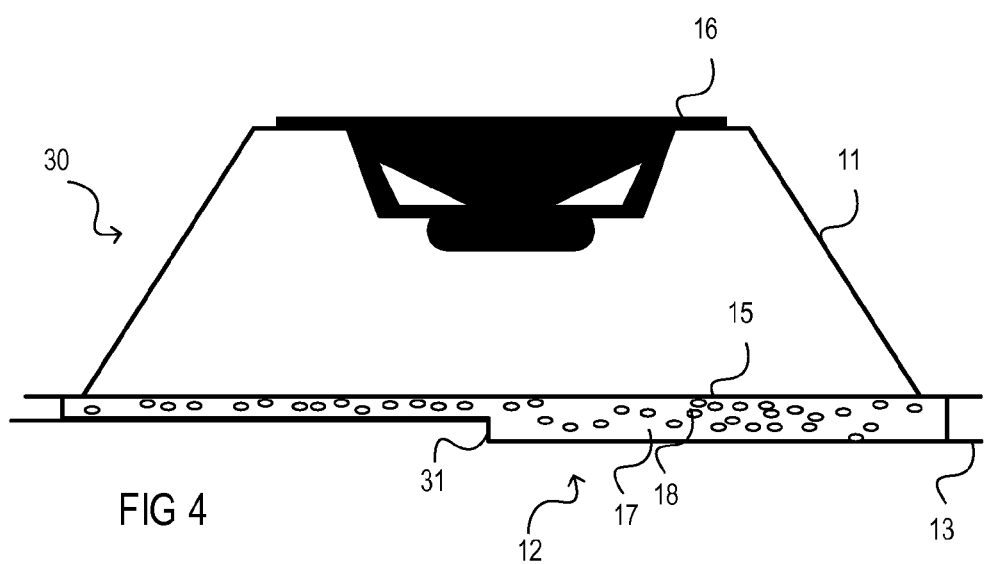
FIG. 4 is a schematic diagram of a third exemplary loudspeaker assembly.

FIG. 4 illustrates a third exemplary loudspeaker assembly 30 in which the loudspeaker carrier 11 is mounted on a mounting site 12 which has a step 31. FIG. 4 illustrates the loudspeaker assembly 10 after activation of the expandable material so that the loudspeaker carrier 11 is mounted via a foam material 17 to the mounting site 12 of the vehicle bodywork 13. The increase in volume of the expandable material achieved by thermal activation can be used to compensate for the step structure of the mounting site 12. The foam material 17 extends between the mounting surface 15 of the loudspeaker carrier 11 and the mounting site 12 of the vehicle bodywork 13. The foam material is also adhesive and secures the loudspeaker carrier 11 to the vehicle bodywork 13 in addition to providing a seal around the loudspeaker carrier 11.

Figure 5:
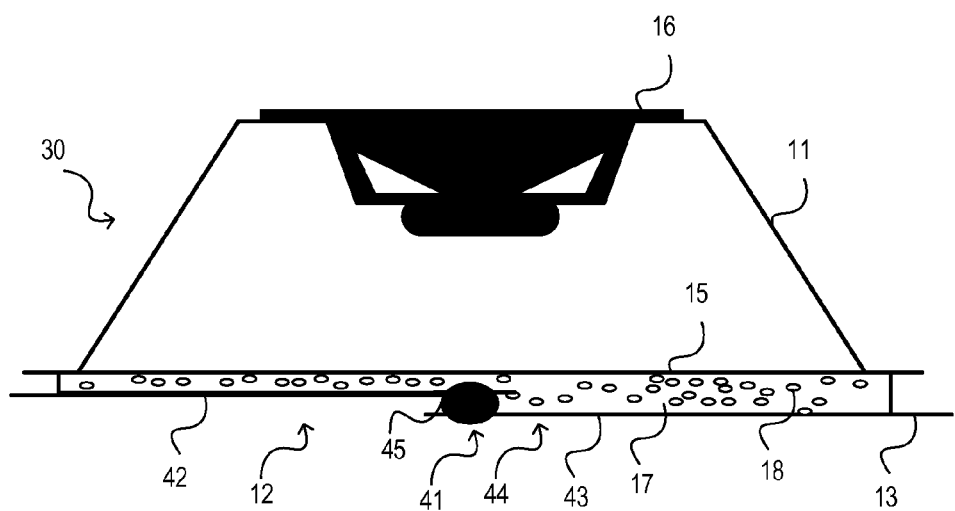
FIG. 5 is a schematic diagram of a fourth exemplary loudspeaker assembly.

FIG. 5 illustrates a fourth exemplary loudspeaker assembly 40 in which the loudspeaker carrier 11 is mounted on a mounting site 12 of the vehicle bodywork 13 by a layer of foamed material 17 which extends between the mounting surface 15 of the loudspeaker carrier 11 and the mounting site 12. The mounting site 12 includes a welded overlapping joint 41 between two portions 42, 43 of the mounting site 12 which produces a step 44 in the mounting site 12 at the welded seam 45 between the two overlapping portions 42, 43.

The foam material 17 is produced by activation of an expandable material. Upon activation, the expandable material is also tacky so that the expanded foam material secures the loudspeaker carrier 11 to the vehicle bodywork 13. Due to the expansion of the expandable material, the step 44 and increased gap between the mounting surface 15 of the loudspeaker carrier 11 and mounting site 12 may be filled so that the foam material 17 extends between mounting surface 15 and the mounting site 12 of the vehicle bodywork 13. The loudspeaker carrier 11 is planar despite the step 44 in the mounting site 12.

The expandable material 14 may be applied to the loudspeaker carrier 11 or to the mounting site 12 of the vehicle bodywork 13. The expandable material 14 may be attached to the loudspeaker carrier 11 by co-molding the expandable material with the loudspeaker carrier 11, for example. The expandable material 14 may be attached by a further adhesive layer or by a mechanical fixing arrangement, for example by lugs or protrusions which protrude from either the loudspeaker carrier or the mounting site.

The use of a temperature activated expandable material and, for example, a temperature activated foamable material which also has an adhesive function enables the attachment and sealing of the loudspeaker carrier 11 to the vehicle bodywork 13 in a single step which can be carried out at the same time as the baking of the anticorrosion coating, primer and or paint of the vehicle bodywork. A typical baking process may be carried out at 160° for around 20 min, for example.

Since the loudspeaker carrier 11 need not be attached to the vehicle bodywork 13 by additional mechanical fixings such as screws, there are fewer restraints on the mechanical stability of the loudspeaker carrier itself. The sue of an expanded layer to provide both adhesion, sealing and acoustic baffling for the loudspeaker carrier may enable the width of the seal and/or the space required for the package as a whole to be reduced. Depending on the composition of the expandable material, the properties of the mounting site, for example roughness and cleanliness, required to achieve a reliable adhesive joint and seal may be less stringent. The expandable material may be used to compensate for variations in bodywork tournaments since the material can expand to fill any cavities, roughness, flange steps, small radii and tangential assembled bodywork.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for mounting a loudspeaker carrier in a vehicle, comprising:
   providing a loudspeaker carrier that directly contacts and supports a loudspeaker;
   providing an expandable material;
   arranging the expandable material on an outer surface of the loudspeaker carrier and on an outer surface of a mounting site on bodywork of the vehicle to attach the loudspeaker carrier to the mounting site; and
   activating the expandable material such that the material expands, forming a foam structure, and causes the loudspeaker carrier to be secured to the bodywork,
   wherein the expandable material is thinnest in a direction parallel to a center axis of the loudspeaker.

2. The method according to claim 1, wherein the expandable material is activated by applying an elevated temperature.

3. The method according to claim 2, wherein the elevated temperature is 100° C. to 250° C.

4. The method according to claim 1, further comprising activating the expandable material by subjecting the loudspeaker carrier, expandable material and vehicle bodywork to an electrocoat bake process.

5. The method according to claim 1, where during the activating, at least outer surfaces of the expandable material become tacky and adhere the loudspeaker carrier to the bodywork.

6. The method according to claim 1, where during the activating, a volume of the expandable material increases from 100% to 1200%.

7. The method according to claim 1, further comprising attaching the expandable material to the loudspeaker carrier by co-molding, by an adhesive layer, or by a mechanical fixing.

8. The method of claim 1 further comprising positioning the loudspeaker distally away from above the mounting site with the loudspeaker carrier.

9. The method of claim 1 further comprising intermediately positioning the loudspeaker carrier between the loudspeaker and the expandable material.

10. The method of claim 1, wherein the outer surface of the loudspeaker carrier includes a first surface, wherein the expandable material is positioned between the first surface and the mounting site, wherein the outer surface of the loudspeaker carrier includes a second surface that extends from the first surface, wherein the outer surface of the loudspeaker carrier includes a third surface that extends from the second surface and is distal to the first surface, and wherein the third surface directly contacts and supports the loudspeaker.

11. A loudspeaker assembly comprising:
    a loudspeaker carrier that directly contacts and supports a loudspeaker;
    a mounting site on a vehicle bodywork; and
    a layer of expandable material arranged between an outer surface of the loudspeaker carrier and the mounting site to attach the loudspeaker carrier to the mounting site,
    wherein the expandable material is activated such that the material expands, forming a foam structure, and causes the loudspeaker carrier to be secured to the body work, and
    wherein the layer of expandable material is thinnest in a direction parallel to a center axis of the loudspeaker.

12. The loudspeaker assembly according to claim 11, where the mounting site comprises at least one of an abutment, a welded seam and a step, or is planar.

13. The loudspeaker assembly according to claim 11, where the expandable material comprises:
    an ionomer;
    a temperature activated foaming agent capable of increasing a volume of the material when the foaming agent is subjected to an elevated temperature; and
    a tackifier for imparting tackiness to at least an outer surface of the expandable material when the expandable material is subjected to the elevated temperature.

14. The loudspeaker assembly according to claim 13, wherein the ionomer is an ethylene-$\alpha,\beta$ ethylenically unsaturated carboxylic acid, partially metallic ion neutralized copolymer ionomer.

15. The loudspeaker assembly of claim 11, wherein the expandable material experiences a volume increase of between 100% and 1200% in response to being exposed to an elevated temperature.

16. The loudspeaker assembly of claim 15, wherein the elevated temperature is between 100° C. and 250° C.

17. The loudspeaker assembly of claim 11, wherein the expandable material is arranged to experience an increase in volume thereof in response to an electro-coating process being performed on the vehicle bodywork.

18. The loudspeaker assembly of claim 11 wherein the loudspeaker faces away from the mounting site.

19. The loudspeaker assembly of claim 11, wherein the loudspeaker carrier positions the loudspeaker distally away from above the mounting site.

20. The loudspeaker assembly of claim 11, wherein the loudspeaker carrier is intermediately positioned between the loudspeaker and the expandable material.

21. The loudspeaker assembly of claim 11, wherein the outer surface of the loudspeaker carrier includes a first surface, wherein the expandable material is positioned between the first surface and the mounting site, wherein the outer surface of the loudspeaker carrier includes a second surface that extends from the first surface, wherein the outer surface of the loudspeaker carrier includes a third surface that extends from the second surface and is distal to the first surface, and wherein the third surface directly contacts and supports the loudspeaker.

22. A loudspeaker assembly comprising:
    a loudspeaker carrier that directly contacts and supports a loudspeaker;
    a mounting site on a vehicle bodywork; and
    foamed material positioned between an outer surface of the loudspeaker carrier and the mounting site to secure the loudspeaker carrier to the mounting site,
    wherein the foamed material is activated such that the material expands, forming a foam structure, and causes the loudspeaker carrier to be secured to the body work, and
    wherein the foamed material is thinnest in a direction parallel to a center axis of the loudspeaker.

23. The loudspeaker assembly according to claim 22, where the foamed material provides a seal between the loudspeaker carrier and the vehicle bodywork.

24. The loudspeaker assembly according to claim 23, wherein the foamed material is further arranged to act as an acoustic baffle to improve sound quality.

25. The loudspeaker assembly according to claim 22, wherein the foamed material is tacky to enable the loudspeaker carrier to be adhesively attached to the mounting site.

26. The loudspeaker assembly of claim 22, wherein the loudspeaker carrier positions the loudspeaker distally away from above the mounting site.

27. The loudspeaker assembly of claim 22, wherein the loudspeaker carrier is intermediately positioned between the loudspeaker and the foamed material.

28. The loudspeaker assembly of claim 22, wherein the outer surface of the loudspeaker carrier includes a first surface, wherein the foamed material is positioned between the first surface and the mounting site, wherein the outer surface of the loudspeaker carrier includes a second surface that extends from the first surface, wherein the outer surface of the loudspeaker carrier includes a third surface that extends from the second surface and is distal to the first surface, and wherein the third surface directly contacts and supports the loudspeaker.

* * * * *